United States Patent [19]

Okamoto et al.

[11] Patent Number: 4,819,612
[45] Date of Patent: Apr. 11, 1989

[54] SELF-HEATING CONTAINER

[75] Inventors: Toshiaki Okamoto, Tokyo; Tomoji Sunagawa; Shun'ichi Sato, both of Nobeoka, all of Japan

[73] Assignee: Asahi Kasei Kogyo Kabushiki Kaisha, Osaka, Japan

[21] Appl. No.: 46,618

[22] Filed: May 7, 1987

[30] Foreign Application Priority Data

| May 8, 1986 | [JP] | Japan | 61-103795 |
| Jul. 31, 1986 | [JP] | Japan | 61-178729 |
| Aug. 20, 1986 | [JP] | Japan | 61-192770 |

[51] Int. Cl.⁴ ............................................. F24J 1/00
[52] U.S. Cl. ........................... 126/263; 102/275.1; 126/262
[58] Field of Search ..................... 126/262, 263; 102/275.1, 275.8

[56] References Cited

U.S. PATENT DOCUMENTS

| 2,239,051 | 4/1941 | Pearsall et al. | 102/275.1 |
| 2,384,278 | 9/1945 | Caldwell | 126/263 |
| 2,914,061 | 11/1959 | Del Raso | 126/262 |
| 2,914,062 | 11/1959 | Del Raso | 126/253 |
| 3,527,201 | 9/1970 | Epstein | 126/263 |
| 3,662,741 | 5/1972 | Licher | 126/263 |
| 4,506,654 | 3/1985 | Zellweger et al. | 126/263 |
| 4,664,674 | 5/1987 | Oftedal et al. | 126/263 |

FOREIGN PATENT DOCUMENTS

| 0180375 | 5/1986 | European Pat. Off. . |
| 1952637 | 4/1971 | Fed. Rep. of Germany . |
| 3126518 | 9/1983 | Fed. Rep. of Germany . |
| 49-143048 | 8/1974 | Japan . |
| 56-64971 | 6/1981 | Japan . |
| 57-55772 | 12/1982 | Japan . |
| 59-60170 | 4/1984 | Japan . |
| 60-70235 | 5/1985 | Japan . |
| 60-94130 | 6/1985 | Japan . |
| 60-190673 | 12/1985 | Japan . |
| 572573 | 10/1945 | United Kingdom . |
| 697846 | 9/1953 | United Kingdom . |
| 899441 | 6/1962 | United Kingdom . |

Primary Examiner—Carroll B. Dority, Jr.
Attorney, Agent, or Firm—Armstrong, Nikaido, Marmelstein & Kubovcik

[57] ABSTRACT

A container capable of heating its content when ignited has a container containing Japanese sake, coffee, soup or the like and an exothermic material storage chamber projected into the container. A self-combustible exothermic material consisting of a mixture of oxidant such as potassium permanganate and a combustible material such as iron powder, ferrosilicon powder or the like is charged into an innermost portion of the storage chamber. A heat insulating layer made of inorganic porous material is disposed adjacent to the exothermic material and ignition means for igniting the exothermic material is extended from the exterior of the container to the exothermic material.

10 Claims, 4 Drawing Sheets

SELF-HEATING CONTAINER

BACKGROUND OF THE INVENTION

1. Field of the Invention

The present invention relates to a self-heating container capable of heating liquid food such as Japanese sake, liquor, coffee or milk, water, oil or the like contained therein.

2. Description of the Prior Art

There has been well known in the art a method for heating or warming liquid contained in a container by using a heating element or exothermic material. In general, food or the like is heated by utilizing hydration of calcium oxide (burnt lime), oxidation or burning or combustion of metal powder.

For instance, Japanese Utility Model Application Laid-Open Nos. 60-70235 and 60-94130 disclose a method in which a chamber for receiving therein exothermic material is defined within a container. Calcium oxide and a water bag are provided in the chamber. When the water bag is broken, an exothermic reaction is started to heat the content in the container. In this method, however, a ratio of a volume of the exothermic material storage chamber to a volume of a content storage space of the container is high, so that its thermal efficiency is not satisfactory. When it is desired to heat the content in the container sufficiently, there arise problems that a large-sized container is required and that a space not filled with the content is likely to be heated. More particularly, when liquid food or the like is charged into the container and then the container is sealed, a space not filled with liquid is generally left. Therefore, depending upon an attitude of the container, such a space is heated by the activated exothermic material, so that the pressure in the container rises to result in explosion thereof.

The same problems arise also in the case of a self-heating container of the type disclosed in European Patent Application Laid-open No. 0180375. In this container, a portion for storing calcium oxide and a water bag is defined around the outer wall of a container to be heated, so that its thermal efficiency is further degraded. Furthermore, there is a danger of burn when the outer wall of the exothermic material storage portion is not sufficiently thermally insulated.

In the above-described inventions, calcium oxide (burnt lime) is used as exothermic material, so that there arise problems that it takes a long time to heat the content to a desired temperature and that after heating the content, calcium oxide expands, resulting in deformation of the container.

U.S. Pat. No. 4,506,654 for Zellweger et al. discloses a heating device in which a container is heated by a combustible exothermic material flatly mounted on the bottom of the container. Japanese Utility Model Application Laid-Open No. 57-55772 discloses a self-heating container of the type in which exothermic material which undergoes an exothermic reaction in the case of its oxidation with oxygen in the air is stored in a concave recess at the bottom.

The self-heating containers of the types described above, however, have a common defect that a space in the container not filled with liquid is overheated when the container is turned upside-down or inclined horizontally or diagonally. In addition, the thermal efficiency is also low, because a part of high temperature heat is dissipated in the direction opposite to the content.

Furthermore, Japanese Patent Application Laid-Open No. 56-64971 discloses a container which is heated when water is added to exothermic material consisting of ammonium persulfate and manganese powder. Such a container, however, requires a large volume of an exothermic material storage portion, and accordingly the same problems as those in case of calcium oxide (burnt lime) are encountered.

Moreover, Japanese Patent Application Publication No. 27-582 or Japanese Utility Model Application Publication No. 58-24119 discloses a heating device in which exothermic material mainly consisting of trilead tetraoxide and ferrosilicon is filled in a metal cylinder. However, a heat output per unit of weight of such exothermic material is relatively low and furthermore there is the possibility that toxic compounds such as lead monoxide result after the combustible reaction, so that from a view point of safety, such exothermic material is not preferably used when heating food.

As described above, in a heating device utilizing exothermic material, the selection of a suitable exothermic material and a design of a container to be heated by the exothermic material are very closely related to each other and therefore most of the conventional heating devices have some defects.

SUMMARY OF THE INVENTION

In view of the above, it is a primary object of the present invention to provide a self-heating container in which heat generated by exothermic material when ignited can be efficiently transferred to a content in the container and which can prevent undesired temperature rise of the outside wall of the container so that the container can be used without a fear of burn.

It is another object of the present invention to provide a self-heating container which can substantially avoid the heating of a space not filled with a content in the container regardless of an attitude thereof so that there is no danger of explosion of the container and therefore the container can be handled safely.

It is a further object of the present invention to provide a self-heating container in which an exothermic material storage space is made small in volume in relation to the container containing liquid or the like to be heated, so that the content storage space efficiency is improved and therefore the self-heating container can be made compact in size.

It is a still further object of the present invention to provide an improved exothermic composition whose aging can be substantially avoided; which can heat a content in a container within a short time; and which will not produce toxic compounds after the combustible reaction, so that the exothermic composition is very satisfactory for heating food and drink from the standpoint of sanitation.

To the above and other ends, the present invention provides a self-heating container comprising a container containing a content to be heated; a chamber projecting inwardly in the container for storing therein an exothermic material; the exothermic material placed at the innermost portion of the exothermic material storage chamber; a heat insulating layer disposed adjacent to the exothermic material; and ignition means having a leading end extended through the heat insulating layer and connected to the exothermic material for igniting the exothermic material.

An exothermic material used in the present invention consists of a self-combustible exothermic composition and can produce an exothermal reaction even in a closed space without using oxygen contained in the air when ignited by suitable ignition means. More particularly, a self-combustible exothermic material in the present invention consists essentially of an oxidant or oxidizing agent and a combustible compound in the form of a mixture, so that the heat output per unit volume of the exothermic material is high and the exothermic material storage space is made small in volume in relation to the container containing a content to be heated.

The exothermic material storage chamber in the present invention is constructed or arranged in such a way that the outer surface of the exothermic material storage portion is substantially in contact with the content to be heated regardless of the attitude or inclination of the container. Especially, even when the container is inclined, the outer surface of the exothermic material storage portion is not substantially exposed to the space not filled with the content to such an extent that the heat is efficiently transferred to the content. For instance, the outer surface of the exothermic material storage portion can be slightly exposed to the space when the container is inclined, as far as the heat generated is substantially completely transferred to the content. In this specification, the relationship of the outer surface with the space is construed in this manner. It is the most preferable, however, that the outer surface of the exothermic material storage portion is completely in contact with the content even when the container is inclined diagonally. Therefore, even when the container is turned upside-down or inclined diagonally or horizontally, it is ensured that the outer surface of the exothermic material storage portion is wrapped by the content in the container, so that the heat transfer efficiency can be enhanced and the heating of a space not filled with the content in the container can be avoided.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
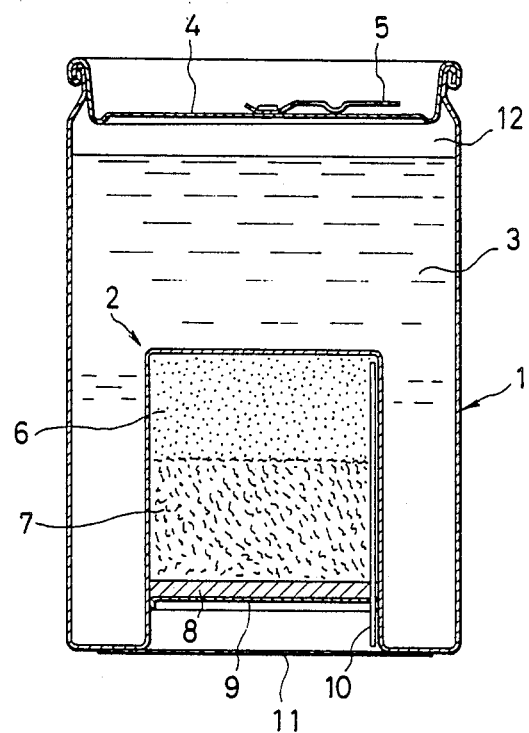
FIG. 1 is a vertical sectional view showing a first embodiment of a self-heating container in accordance with the present invention which is in an upright position.
Figure 2:
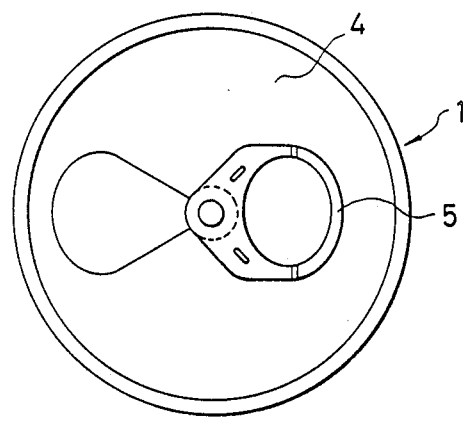
FIG. 2 is a plan view thereof.
Figure 3:
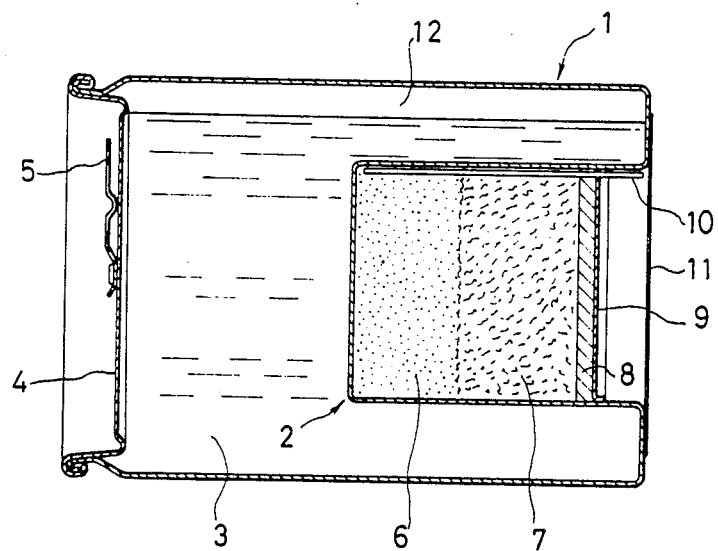
FIG. 3 is a vertical sectional view thereof when it is horizontally positioned.

A first embodiment of the present invention shown in FIGS. 1, 2 and 3 comprises a steel, stainless steel, aluminum or copper cylindrical container 1 containing a content to be heated such as Japanese sake, liquor, coffee or soup and a cylindrical exothermic material storage chamber 2 projecting from the bottom of the container 1 thereinto by a predetermined depth in coaxial relationship with the container 1. The chamber 2 is formed integrally with the container 1.

The depth or height of the exothermic material storage chamber 2 is selected to be higher than one half of the height of the cylindrical container 1, so that exothermic material to be described in detail hereinafter can be disposed substantially in the core of the cylindrical container 1.

The diameter of the exothermic material storage chamber 2 is of the order of from 1/5 to ⅔ of the diameter of the cylindrical container 1.

The upper end of the cylindrical container 1 is closed with a lid 4 after a content 3 to be heated is filled into it. The lid 4 is provided with a pull tab 5 which opens a drinking or discharging opening in the lid 4 when the tab 5 is pulled out of the lid 4.

A self-combustible exothermic material 6 is disposed in an innermost portion in the exothermic material storage chamber 2 and a heat insulating layer 7 is disposed in contact with and outwardly of the exothermic material 6. A metal plate 9 is forcibly inserted into the exothermic material storage chamber 2 and pressed against the heat insulating layer 7 through a sponge layer 8.

A fuse 10 is extended along the inner cylindrical surface of the exothermic material storage chamber 2 through the metal plate 9, the sponge layer 8 and the heat insulating layer 7 in such a way that the inner end of the fuse 10 is connected to the self-combustible exothermic material 6 while the outer end thereof is extended outwardly beyond the metal plate 9.

An opening of the storage chamber 2 is preferably covered with a sheet 11 so that the exothermic material 6 is prevented from absorbing moisture in the air. Alternatively, a plastic cap may be fitted into the opening thereof.

In the first embodiment with the above-described construction, a space 12 is left between an upper surface of the content 3 to be heated and the lid 4 when the cylindrical container 1 is in an upright attitude as shown in FIG. 1. When the cylindrical container 1 is positioned horizontally as shown in FIG. 3, a space 12 exists between the upper surface of the content 3 to be heated and the cylindrical wall of the container 1. However, when the fuse 10 is fired by a match or a lighter regardless of the upright, horizontal or upside-down position (not shown), the self-combustible exothermic material 6 is ignited to produce an exothermal reaction. In this case, the outer surface or heat transfer surface of the innermost portion of the storage chamber 2 in which the exothermic material 6 is stored is surrounded or wrapped by the content 3 to be heated due to the provision of the heat insulating layer 7 so that the heating of the empty space 12 can be positively prevented.

More preferably, regardless of the attitude of the cylindrical container 1, the upper end of the heat transfer surface of the exothermic material storage chamber 2 which is made in contact with the content 3 to be heated is spaced apart from the liquid level, that is, the surface of the content 3 by a distance longer than one centimeter.

Figure 4:
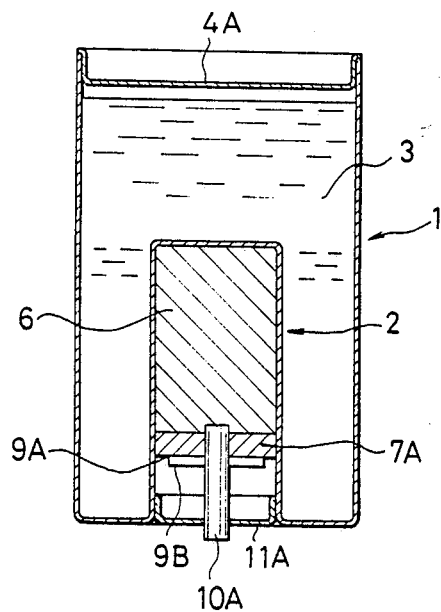
FIG. 4 is a vertical sectional view showing a second embodiment of the present invention.

A second embodiment of the present invention shown in FIG. 4 is substantially similar in construction to the first embodiment described above with reference to FIGS. 1, 2 and 3 so that same reference numerals are used to designate similar parts in FIGS. 1, 2, 3 and 4 and only the construction of the second embodiment different form that of the first embodiment will be described below.

That is, according to the second embodiment, an aluminum disc 9A and a ring washer 9B are forcibly fitted into the storage chamber 2 so as to press the heat insulating layer 7A adjacent to the self-combustible exothermic material 6. Furthermore, the upper lid 4A is tightly pressed into the cylindrical container 1. A fuse 10A is extended through the heat insulating layer 7A coaxially thereof in such a way that one end of the fuse 10A is connected to the exothermic material 6 while the other (lower end in FIG. 4) is extended through a cap 11A which closes the opening of the storage chamber 2 in order to prevent the exothermic material 6 from absorbing moisture in the air.

Figure 5:
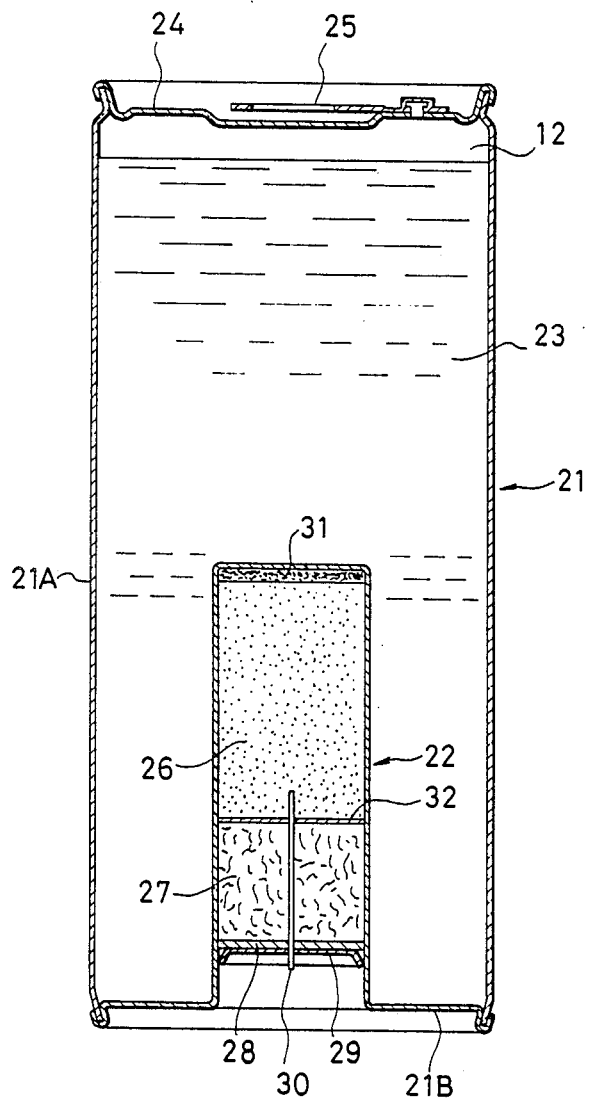
FIG. 5 is a vertical sectional view showing a third embodiment of the present invention.

Referring next to FIG. 5, a third embodiment of the present invention will be described. As in the case of the first embodiment, the third embodiment uses a cylindrical container 21, but the cylindrical wall 21A is made of a steel while the bottom 21B is made of a aluminum independently of the cylindrical steel side wall 21A. An exothermic material storage chamber 22 is in the form of a cylinder projecting from the bottom 21B into the container 21 coaxially thereof.

A top lid 24 is of a pull top type having a pull tab 25 so that the lid 24 can be easily opened when the tab 25 is pulled by hand.

An inorganic inert material layer 31 is interposed between the self-combustible exothermic material 26 and the bottom of the storage chamber 22, so that the area of the contacting surface between the portion where the exothermic material 26 is charged and the content 23 to be heated is decreased, whereby the boiling noise can be lowered. Furthermore, a metal disc or a metal film 32 having a hole which allows to pass a fuse 30 is interposed between the exothermic material 26 and the heat insulating layer 27 so that the mixing of the exothermic material 26 and the heat insulating layer 27 can be prevented.

A fuse 30 is extended through the heat insulating layer 27 coaxially thereof in such a way that one end of the fuse 30 is connected to the exothermic material 26 while the other end thereof is extended through a sponge layer 28 and a metal plate 29 to the exterior of the container 21.

In the third embodiment, the fuse 30 is fired also by a match or a lighter so that the exothermal reaction of the exothermic material 26 proceeds, but there is no danger that an empty space left in the container 21 is heated because the exothermic material 26 is disposed substantially in the core of the content 23 to be heated.

Figure 6:
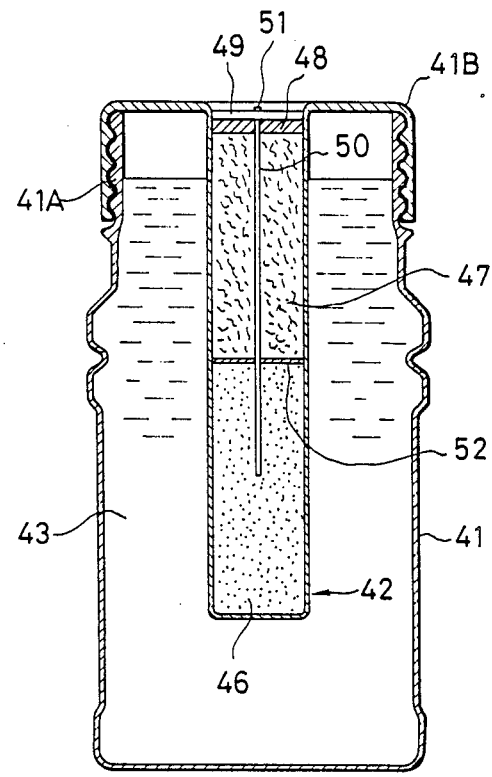
FIG. 6 is a vertical sectional view showing a fourth embodiment of the present invention.

Referring next to FIG. 6, a fourth embodiment of the present invention will be described. In this embodiment, the present invention is applied to a glass or plastic bottle 42 containing a content to be heated.

An aluminum or steel cylindrical exothermic material storage chamber 42 is projected into the bottle 41 from a cap 41B threadably engaged with a threaded portion 41A of the bottle 41 coaxially thereof.

A self-combustible exothermic material 46, a metal disc 52 formed with a hole, a heat insulating layer 47, a sponge layer 48 and a metal plate 49 are disposed in order in the storage chamber 42 from the bottom thereof.

A fuse 50 for igniting the exothermic material 46 is extended through the metal disc 52, the heat insulating layer 47, the sponge layer 48 and the metal plate 49 coaxially thereof into the exterior of the bottle 41. A match head composition 51 is bonded on the exterior end of the fuse 50. It is insured that one easily catches fire using match striking material.

The self-combustible exothermic materials 6, 26 and 46 used in the self-heating containers in the present invention can be ignited and burned in an enclosed space without oxygen in the air, causing the exothermic reaction. That is, each exothermic material consists essentially of a mixture of oxidant and combustible compound.

In order to attain the objects of the present invention, it is important that the space filled with an exothermic material is small and it is preferable that Caloric output per unit volume is at least higher than 300 cal/cc. Furthermore, it is not preferable to use an exothermic material which melts and flows out of the storage chamber and produces toxic gases when ignited and burned.

As described above, the exothermic material used in the present invention is a mixture of oxidant and combustible compound. Potassium permanganate, manganese dioxide, trilead tetraoxide, barium peroxide, bromates and chlorates and so on can be used in the present invention as oxidant. While the combustible compounds which can be used in the present invention are metal powder of iron, silicon, ferrosilicon, aluminum, magnesium, copper and so on. In addition, in order to control the exothermic reaction of the self-combustible exothermic material, one or more inorganic inert material such as alumina, ferrite, silica sand, diatom earth and so on which will not discharge water and gases at high temperature can be added.

When a substance to be heated is food and drink, the most preferable self-combustible exothermic material is a mixture of potassium permanganate and one or more metal powder with or without an addition of one or more inorganic inert materials. Such exothermic materials have an extremely small degree of toxicity before and after the exothermic reaction, have a relatively high heat output per volume as compared with other materials and will not produce toxic gases.

Potassium permanganate used in the present invention may be an industrial grade available in the commercial market and it is preferable that the particle size is less than 20 mesh and more preferably from 100 to 350 mesh from the standpoint of its reactivity and handling properties.

The metal powder which is used as combustible compound in the present invention, is easily oxidized by oxygen and will not react explosively when mixed with potassium permanganate. As an example of the preferable metal powder is one selected from the group consisting of iron powder, silicon powder, ferrosilicon powder, aluminium powder, magnesium powder and copper powder. Especially iron powder chemically reacts at a relatively low rate and it is easy to control its heat output. It is preferable that the particle size of metal powder is smaller than at least 60 mesh and it is more preferable that it is between 100 and 350 mesh from the standpoint of its reactivity and handling properties.

The mixing ratio is such that 10 to 90% by weight of potassium permanganate may be mixed with iron powder. When potassium permanganate and iron powder are used to produce an exothermic reaction, it is preferable that the ratio of potassium permanganate be between 30 and 50% by weight to iron powder. However, when an inorganic inert material to be described hereinafter are added, it is preferable that the ratio of potassium permanganate be between 50–70% by weight.

An exothermic material can be prepared by mixing potassium permanganate as oxidant or oxidizing agent with iron powder and silicon powder or ferrosilicon powder as metal powder.

In this case, it is preferable that the exothermic material consists of 25-85% by weight of potassium permanganate and 15-75% by weight of iron powder to which silicon powder or ferrosilicon powder is added so that 0.05-5% by weight of silicon per se is included as outer percentage. In this case, the heat output is increased, so that the content can be heated at a high temperature.

Even in this case, the content of potassium permanganate is most preferably between 25 and 40% by weight in relation to iron powder because in the case of burning, it will not melt and flow out of the exothermic material storage chamber.

The particle size of silicon or ferrosilicon powder used in the present invention suffices to be less than 100 mesh or more preferably between 200 and 350 mesh from the standpoint of its reactivity. The content of silicon per se of silicon powder or ferrosilicon powder is higher than 0.05 but less than 5 by outer weight percentage from the standpoint of safety because the effects obtained by the addition of silicon or ferrosilicon powder is less when the content is less than 0.05% by weight while the reaction is too strong when the content is higher than 5% by weight. It is more preferable that 0.05-2.5 outer wt.% of silicon per se of silicon powder or ferrosilicon powder be added because the exothermic material will not melt during burning, so that there is no danger that the melted exothermic material flows out of the storage chamber.

The method for preparing the exothermic materials in the present invention is only to uniformly mix potassium permanganate and iron powder and/or silicon powder or ferrosilicon powder. According to the present invention, any mixers can be used unless they receive strong impacts and encounter a high degree of friction.

The exothermic materials in the present invention can remarkably increase their heat output when a small quantity of silicon powder or ferrosilicon powder is added to a mixture of potassium permanganate and iron powder. As a result, the content in a container can be heated at various temperatures by changing the amount of addition of silicon powder or ferrosilicon powder without changing size of the container.

In addition to potassium permanganate and metal powder, one or more inorganic inert materials may be added to the exothermic material in the present invention used for heating food and drink. Preferably, inorganic inert materials are rock powder, glass powder, aluminum oxide, silicic acid and so on which will not discharge water and/or gases when heated at high temperature.

Up to 50 outer wt.% of inorganic inert material can be added to a mixture of potassium permanganate and metal powder.

The method for preparing the exothermic material in the present invention for heating food and drink consists of only one step for uniformly mixing potassium permanganate and metal powder or potassium permanganate, metal powder and one or more inorganic inert materials. The present invention can use any suitable mixers which will not receive strong impacts and encounter a high degree of friction.

The heat insulating layer 7, 27 or 47 which is disposed outwardly of the exothermic material 6, 26 or 46 which in turn is inserted into the innermost portion of the exothermic material storage chamber 2, 22 or 42 is made of a material which is non-combustible and has a high heat insulation capability. Preferably it has not only a function of plugging the exothermic material but also a function of a filter for gases and the like discharged during the burning of the exothermic material.

When the exothermic material is burned, its temperature rises as high or higher than 1000° C. so that in order to attain a desired degree of heat insulation, it is preferable to use perforated or porous inorganic materials. Furthermore, in order to further ensure a sufficient degree of heat insulation from the exothermic material burning at a temperature higher than 1000° C., the thickness of the heat insulating layer must be thicker than at least 1-1.5 cm. The inorganic perforated or porous materials have in general a high degree of air permeability so that it also functions as a filter which can filter the steam of water absorbed in and evaporated from the exothermic material or metal vapor.

Perforated or porous inorganic materials which can be used as the heat insulating layer 7, 27 or 47 are, for instance, rock powder, volcanic ash, glass powder and their foamed materials. The most preferable material is vermiculite obtained by foaming rock powder. Vermiculite has not only a high degree of heat insulation capability and a high permeability but also a satisfactory degree of resiliency and formability, so that it has a high degree of workability.

The fuse 10, 30 or 50 for igniting the self-combustible exothermic material 6, 26 or 46 may be one used to ignite the gun powder. However, it is more preferable to use a fuse consisting of a bundle of filaments or fibers impregnated with a self-combustible agent because the smoke produced during the burning of the fuse can be reduced in minimum in quantity.

Carbon fibers and metal fibers, such as stainless steel, copper, aluminum fiber and the like, can be used as fibers of the fuse. A preferable self-combustible agent consists of trilead peroxide and metal powder impregnated with nitrocellulose which serves as a binder. In order to ensure the successive burning of the fuse even when the latter is made in contact with the wall of the exothermic material storage chamber, the cross sectional area of each single filament is less than $1 \times 10^{-2}$ mm$^2$ and at least 50 filaments must be bundled as a fuse. The upper limit of the number of such fibers is of the order of 10000. A bundle of 1000 stainless steel fibers 10 micron across is preferred.

In order to ensure the impregnation of a self-combustible agent sufficiently to the core of the bundle of fibers, it is preferable that the particle size of the self-combustible agent is of the order of 200 mesh.

Instead of the fuse 10, 30 or 50, an electrical ignition device can be used to ignite the self-combustible exothermic material. That is, a heater attached at the leading end of an electric wire is embedded into the exothermic material layer 6, 26 or 46 and a pair of electric wires are extended out of the exothermic material storage chamber to the exterior so that when the electric energy is supplied to the heater through the electric wires from, for instance, a battery, the exothermic material is ignited.

However, according to the present invention, the exothermic material contains metal powder, so that there exists a fear that the supplied electric current flows through the metal powder surrounding the heater and consequently the heater is not energized. It follows therefore that it is preferable that the heater embedded in the exothermic material layer is electrically insulated. More preferably, in order to ensure the positive ignition, the heater is coated with an ignition material such as a match head composition.

The main body of the self-heating container containing a substance to be heated may be fabricated from a material such as metal, paper, plastic or composite material thereof which will not be softened, deformed or damaged when the content is heated to 80°–90° C. Therefore, the materials of the main body of the self-heating container in the present invention are not especially limited.

The exothermic material storage chamber is made of metal having a high degree of heat conductivity and a high degree of workability. For instance, it is made of aluminum, copper, stainless steel or the like.

The portion of the exothermic material storage chamber in which is disposed the exothermic material is positioned in such a way that it is substantially in contact with the content to be heated regardless of the attitude of the container. Therefore, the exothermic material storage chamber must be projected into the self-heating container by a suitable length, but since the heat output per unit volume of the self-combustible exothermic material is high and the thermal efficiency is also high, the volume of the exothermic material storage chamber can be made small. More specifically, the ratio of the volume of the exothermic material storage chamber to the volume of the container may be less than 25%.

Next, some of the examples of the present invention will be described.

EXAMPLE 1

An aluminum exothermic material storage chamber 35 mm in inner diameter and 50 mm in length was projected into an aluminum container as shown in FIG. 1 which was 65 mm in outer diameter and 85 mm in length. A self-combustible exothermic material 6 consisting of a mixture of 10 grams of potassium permanganate less than 200 mesh and 15 grams of iron powder less than 200 mesh was disposed at the innermost portion of the storage chamber 2. A heat insulating layer 7 seven grams by weight made of vermiculite was placed outwardly of the exothermic material 6 in the storage chamber 2 and urethan sponge layer 8 is disposed outwardly of the heat insulating layer 7. Thereafter, the metal plate 9 whose peripheral portion was partially cut out was fitted into the storage chamber 2. The fuse 10 comprising carbon filaments and a mixture of ferrosilicon and red lead, the mixture was bonded to the carbon filaments with nitrocellulose, was extended from the opening through the cut-out portion of the metal plate 9 to the self-combustible exothermic material layer 6. More specifically, the fuse 10 was prepared by dipping a boudle of 3000 carbon filaments (each filament is 8 $\mu$m in diameter into 5 grams of acetone solution of 4% nitrocellulose having H$\frac{1}{2}$ second grate (JIS K-6703-1975), the acetone solution being mixed with 7 grams of red lead less than 200 mesh and 3 grams of ferrosilicon less than 200 mesh, and then by evaporating the acetone. The fuse thus obtained was 22 milligrams by weight per one centimeter. 200 cc of Japanese sake was filled in the container with the above-described construction. The exothermic material layer was about 10 mm in thickness; the heat insulating layer, 30 mm in thickness; and the empty space 12 left after Japanese sake was filled into the container 1 was about 10 mm in thickness when the container 1 was maintained in an upright attitude as shown in FIG. 1. Next, the container 1 was turned upside-down and then a match was used to fire one exposed end of the fuse 10. After 3 minutes, Japanase sake which was filled at a temperature of 10° C. was heated to 40° C. The heat output of the self-combustible exothermic material was 320 cal/g. The thermal efficiency was 75%.

EXAMPLE 2

The self-heating container 1 which was the same as that described above in EXAMPLE 1 was inclined horizontally as shown in FIG. 3 and then one exposed end of the fuse 10 was fired by a match. In 3 minutes after ignition, Japanase sake which was filled in the container 1 at 10° C. was heated to 40° C. Even though the container 1 was heated in an abnormal attitude, but it was not deformed or damaged.

EXAMPLE 3

The container 1 which was substantially similar to that as described above with reference to FIG. 1 was used, however, the exothermic material 6 was varied in quantity in order to evaluate the effect of the variation in exothermic material 6. That is, 15 grams of KMnO$_4$ less than 200 mesh and 22.5 grams of iron powder less than 200 mesh were mixed and inserted into the innermost portion of the exothermic material storage chamber 2. Thereafter, 7 grams of vermiculite was forcibly packed as heat insulating layer 7. The exothermic material layer was 15 mm in thickness, and the heat insulating layer was 30 mm in thickness. The content in the container 1 was 200 cc of coffee. Except the above-described conditions, other experimental conditions were substantially similar to those of EXAMPLE 1. The container 1 was maintained in an upright attitude as shown in FIG. 1 and then one exposed end of the fuse 10 was fired by a match. In 3 minutes after that ignition, coffee which was filled at 10° C. in the container was heated to 56° C.

EXAMPLE 4

The container 1 which was substantially similar in construction to that described above with reference to FIG. 1 was used and a self-combustible exothermic material mixture 6 consisting of 15 grams of KMnO$_4$ less than 200 mesh, 22.5 grams of iron powder less than 200 mesh and 0.75 grams of ferrosilicon powder less than 200 mesh was charged into the storage chamber 2. Thereafter 200 cc of consomme soup was filled into the container 1 as a content 3 to be heated. The exothermic material layer 6 was 15 mm in thickness and the heat insulating layer was 30 mm in thickness. The remaining conditions were similar to those of EXAMPLE 1. The container 1 with the above-described construction and containing consomme soup was maintained in an upside-down attitude, so that the opening of the storage chamber 2 is directed upwardly. Next one exposed end of the fuse 10 was fired by using a match. In 3 minutes after the ignition, consomme soup which was filled in the container at 10° C. was heated to 65° C. The heat output of the self-combustible exothermic material 6 was 350 cal/g. The thermal efficiency was 82.5%.

EXAMPLE 5

200 ml of Japanese sake was filled in a steel cylindrical container 1(65 mm in diameter and 85 mm in height) having an exothermic material storage chamber 2 (35 mm in diameter and 50 mm in length) which was substantially similar in construction to the container 1 as shown in FIG. 1. The exothermic material 6 was a mixture of 10 grams of potassium permanganate less than 200 mesh, 15 grams of iron powder less than 200 mesh and 3 grams of silica sand less than 200 mesh. The fuse 10 consists of a mixture of trilead tetraoxide and ferrosilicon which was wrapped with glass fibers. The heat insulating layer 7 consisted of foamed or calcined volcanic ash (Shirasuballoon) and the metal plate 9 was made of aluminum. The remaining experimental conditions were substantially similar to those described above with reference to EXAMPLE 1. The fuse 10 was fired by using a match. In 3 minutes after the ignition, Japanese sake which was filled at 10° C. in the container 1 was heated to 43° C. No abnormal phenomenon of the container 1 was observed.

EXAMPLE 6

The aluminum can or container 1 having the construction as shown in FIG. 4 was used. The can 1 was 65 mm in diameter and 120 mm in height. The exothermic material storage chamber 2 was 30 mm in diameter and 75 mm in length. 300 ml of Japanese sake was filled in the can 1. The exothermic material 6 was a mixture of 15 grams of potassium permanganate less than 200 mesh and 23 grams of iron powder less than 200 mesh. The heat insulating layer 7A consisted of inorganic sponge and the bottom of the storage chamber 2 was sealed with an aluminum plate 9A and a spring washer 9B. The fuse 10A consisted of a hemp cord impregnated with trilead teraoxide and ferrosilicon with nitrocellulose as a binder. In 3 minutes after the ignition of the exothermic material 6, Japanese sake which was filled into the can 1 at 10° C. was heated to 42° C. No abnormal phenomenon of the can 1 was observed.

EXAMPLE 7

The aluminum can 1 which was substantially similar in construction to that shown in FIG. 4 and has a reduced volume of 200 cc (53 mm in diameter and 95 mm in height) was used and an aluminum storage chamber 20 mm in diameter and 70 mm in length was projected inside the can 1 from the bottom thereof. A mixture consisting of 20 grams of potassium permanganate (250 mesh), 12 grams of iron powder (350 mesh), one gram of ferrosilicon (200 mesh) and 5 grams of rock powder (250 mesh) was charged into the innermost portion of the storage chamber 2. 160 cc of consomme soup was filled in the aluminum can 1. The exothermic material 6 was fired by using a time-delayed fuse 10A. The remaining experimental conditions were substantially similar to those of EXAMPLE 6. Consomme soup which was at 20° C. before ignition was heated to 85° C. in 3 minutes after the ignition.

EXAMPLE 8

The aluminum can 1 whose construction was substantially similar to that shown in FIG. 4 and which has a volume of 200 cc (53 mm in diameter and 95 mm in height) was used and the exothermic material storage chamber 2 30 mm in diameter and 65 mm in length was projected into the aluminum can 1 from the bottom thereof. A mixture consisting of 18 grams of potassium permanganate (250 mesh) and 26 grams of iron powder (350 mesh), 6 grams of rock powder (100 mesh) was charged as an exothermic material at the innermost portion of the storage chamber 2. 160 cc of consomme soup was filled in the aluminum can 1 and the exothermic material 6 was ignited by using time-delayed fuse 10A. The remaining experimental conditions were substantially similar to those of EXAMPLE 6. Consomme soup which was at 20° C. before ignition was heated to 80° C. after the burning of the exothermic material 6 in 3 minutes.

EXAMPLE 9

The container whose volume was increased as shown in FIG. 5 was used. The can 21 was 65 mm in diameter and 110 mm in height while the exothermic material storage chamber 22 was 25 mm in diameter and 75 mm in height. The cylindrical wall of the can 21 is made of steel while the top and the bottom of the can 21 from which the storage chamber 22 was extended therein was made of aluminum. 0.7 grams of vermiculite was charged as an inert material layer 31 in the innermost portion of the storage chamber 22. Then, the exothermic material consisting of 15 grams of $KMnO_4$ less than 200 mesh and 23 grams of iron powder less than 200 mesh was charged. Thereafter a steel disc 32 with a center hole was forcibly fitted into the storage chamber 22 and then the fuse 30 was inserted into the exothermic material 26 through the center hole of the steel disc 32. Next 5 grams of vermiculite was packed and the bottom of the storage chamber 22 was closed with the inorganic sponge 28 and the metal plate 29. The fuse 30 was extended through a center hole of the metal plate 29 into the exterior of the can 1. 300 ml of Japanese sake was filled in the can 21 as a content to be heated. The innermost vermiculite layer 31 was 2 mm in thickness; the exothermic material 26 was 29 mm in thickness; and the heat insulating layer 27 was 31 mm in thickness. The thickness of the space left when 300 cc of Japanese sake was filled into the container 21 maintained in an upright attitude as shown in FIG. 5 was about 8 mm. One end of the fuse 30 extended out of the can 1 was fired by utilizing a match while the can 21 was held in an upright position as shown in FIG. 5. The content; that is, Japanese sake which was at 10° C. before ignition was heated to 42° C. in 3 minutes after ignition. The heat output of the self-combustible exothermic material was 320 cal/g and the thermal efficiency was therefore 80%.

EXAMPLE 10

The upper opening of a polyethlene terephthalate container 41 about 55 mm in diameter and 110 mm in length was reduced to about 45 mm in diameter and an aluminum exothermic material storage chamber 42 was extended into the interior of the container 41 from the top cover 41B coaxially thereof as shown in FIG. 6. A self-combustible exothermic material consisting of a mixture of 8 grams of $KMnO_4$ less than 200 mesh and 12 grams of iron powder less than 200 mesh was charged into the innermost portion of the storage chamber 42 and then vermiculite was packed as heat insulating layer 47. Next, urethane sponge 48 was packed and then the metal plate 49 with a center hole was forcibly fitted into the storage chamber 42. The fuse 50 consisting of carbon fibers bonded with a mixture of ferrosilicon and red lead with nitrocellulose was extended from the open top of the storage chamber 42 through the hole of the metal disc 52 into the self-combustible exothermic material 46. Next 180 cc of Japanese sake was filled into the container 41. The exposed upper end of the fuse 50 was fired by using a match while the container 41 was maintained in an upright attitude as shown in FIG. 6. Then, Japanese sake which was at 10° C. before ignition was heated to 35.5° C. in 3 minutes after ignition. The heat output of the self-combustible exothermic material 46 was 320 cal/g and the thermal efficiency was therefore 80%.

EXAMPLE 11

The plastic container 41 which was substantially similar in construction to the container as shown in FIG. 6 and had a volume of 200 cc was used. An aluminum storage chamber 42 which was 16 mm in diameter and 100 mm in length was extended from the top cover of the container 41 into the interior thereof. An exothermic material consisting of a mixture of 9 grams of potassium permanganate (200 mesh) and 6 grams of iron powder (250 mesh) was charged into the innermost portion of the storage chamber 42. 180 cc of Japanese sake was filled into the plastic container 41 and the exothermic material 46 was ignited by firing the time-delayed fuse 51. The remaining conditions were substantially similar to those of EXAMPLE 10. Japanese sake or content in the plastic container 41 which was 15° C. before ignition was heated to 49° C. after the burning of the exothermic material 46.

EXAMPLES 11–21 and COMPARISON EXAMPLES 1 and 2

In each example, the plastic container 41 having the construction as shown in FIG. 6 and the volume of 200 cc was used and the aluminum exothermic material storage chamber 42 which was 16 mm in diameter and 10 mm in length was extended from the top cover 41B of the plastic container 41 into the interior thereof and 20 grams of the exothermic material having the composition as shown in TABLES 1 and 2 was charged into the innermost portion of the storage chamber 42. In each example, 180 ml of Japanese sake was filled into the plastic container 41 and the exothermic material 46 was ignited by using the time delay fuse 50. Japanese sake or content of the plastic container 41 was 20° C. before ignition and the temperature rise of Japanese sake after the burning of the exothermic material is expressed by ΔT and shown in TABLES 1 and 2. Whether or not the exothermic materials were melted during their burning reactions was determined in accordance with the conditions of the grains left after the burning reaction of each exothermic material. In the EXAMPLES 11–18 and COMPARISON EXAMPLES 1 and 2, the exothermic materials each having a mixture of potassium permanganate less than 100 mesh, iron powder less than 200 mesh and ferrosilicon which was less than 250 mesh and containing 75% of silicon as shown in TABLE 1 were used. In Example 19, silicon powder which was less than 200 mesh and had a purity of 99.5% was used while in Example 21, ferrosilicon which was less than 10 mesh and containing 25% of silicon was used. The procedure of Example 20 was the same as that of Example 11.

Even some of the exothermic materials shown in TABLE 1 melted, but in the case of the container 41 in which the exothermic material storage chamber 42 is depending from the top cover 41B as shown in FIG. 6, they can be used satisfactorily in practice because they will not flow out of the storage chamber 42.

TABLE 1

| | KMnO₄ (wt %) | Fe (wt %) | *Si (wt %) | ΔT (°C.) | Melted? |
|---|---|---|---|---|---|
| Example 11 | 30 | 70 | 1.5 | 27 | No |
| Example 12 | 80 | 20 | 1.5 | 37 | Yes |
| Example 13 | 40 | 60 | 5.5 | 48 | Yes |
| Example 14 | 40 | 60 | 4.5 | 44 | Yes |

TABLE 1-continued

| | KMnO₄ (wt %) | Fe (wt %) | *Si (wt %) | ΔT (°C.) | Melted? |
|---|---|---|---|---|---|
| Example 15 | 35 | 65 | 1.5 | 31 | No |
| Example 16 | 45 | 55 | 1.5 | 38 | Yes |
| Example 17 | 30 | 70 | 3.0 | 35 | Yes |
| Example 18 | 30 | 70 | 2.0 | 29 | No |
| Comparison Example 1 | 20 | 80 | 1.5 | 17 | No |
| Comparison Example 2 | 90 | 10 | 1.5 | 13 | No |

*in terms of silicon when ferrosilicon is used.

TABLE 2

| | KMnO₄ (wt %) | Fe (wt %) | Si contents (wt %) | *Si (wt %) | ΔT (°C.) | Melted? |
|---|---|---|---|---|---|---|
| Example 19 | 30 | 70 | 99.5 | 1.5 | 27 | No |
| Example 20 | 30 | 70 | 75 | 1.5 | 27 | No |
| Example 21 | 30 | 70 | 25 | 1.5 | 28 | No |

*in terms of silicon when ferrosilicon is used.

What is claimed is:

1. A self-heating container comprising:
   a container for containing a substance to be heated;
   an exothermic material storage chamber which is made of metal and is projected into the interior of said container;
   a non-fusible self-combustible exothermic material charged at the innermost portion of said exothermic material storage chamber and located substantially in the core portion of said container;
   a heat insulating layer of a porous inorganic material disposed outwardly adjacent to said exothermic material; and
   a fuse comprising a bundle of metal fibers or carbon fibers impregnated with a self-combustible agent having a leading end extending through the heat insulating layer and connected to said exothermic material for igniting said exothermic material.

2. A self-heating container as claimed in claim 1, wherein said exothermic material consists essentially of a mixture of potassium permanganate and metal powder.

3. A self-heating container as claimed in claim 1, wherein said container containing a substance to be heated is in the form of a cylindrical can and said exothermic material storage chamber is formed integral with a bottom of said can.

4. A self-heating container as claimed in claim 1, wherein said self-combustible agent is composed of a mixture of metal powder and a material selected from the group consisting of metal oxide, metal peroxide and metal oxide salts.

5. A self-heating container as claimed in claim 1, wherein said heat insulating layer having permeability is so disposed as to cover the whole exposed surface of said exothermic material.

6. A self-heating container as claimed in claim 1, wherein said container containing a substance to be heated except said exothermic material storage portion is made of a material selected from the group consisting of metal, plastics and paper.

7. A self-heating container as claimed in claim 1, wherein said exothermic material storage chamber is securely attached to a detachable cover.

8. A self-heating container as claimed in claim 1, wherein the cross-sectional area of each of the said fibers is less than $1 \times 10^{-2}$ mm².

9. A self-heating container as claimed in claim 8, wherein the number of said fibers is at least 50 and less than 10,000.

10. A self-heating container as claimed in claim 1, wherein said heat insulating layer of porous inorganic material is vermiculite.

* * * * *